June 28, 1949.                    J. MULLER                    2,474,319
                              COUPLING FOR PIPING
Filed Nov. 27, 1942                                           2 Sheets-Sheet 1
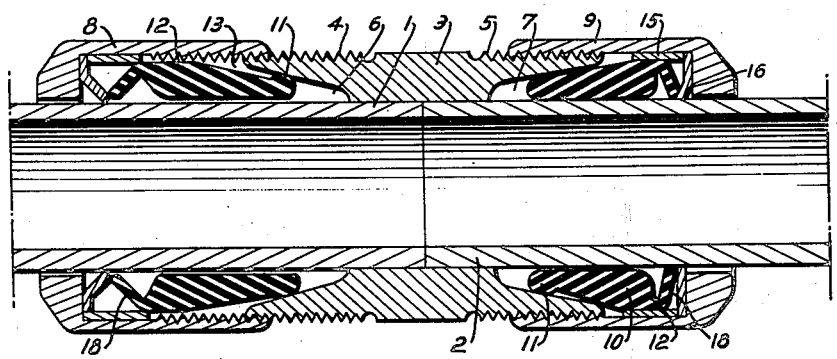
Fig.1.
Fig.2.
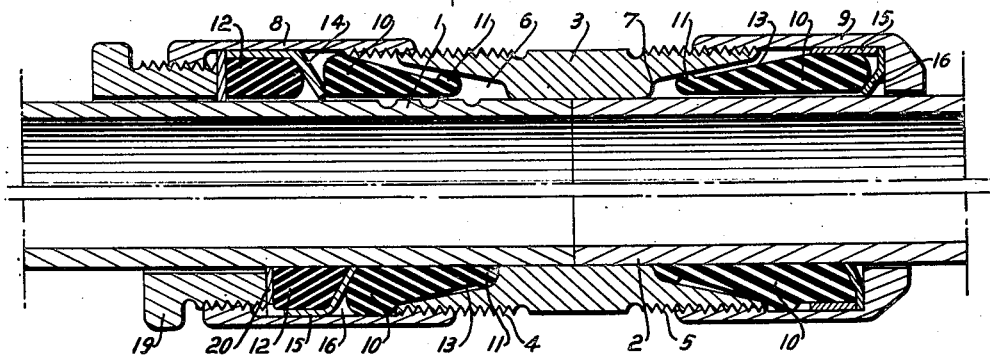
Fig.2A.
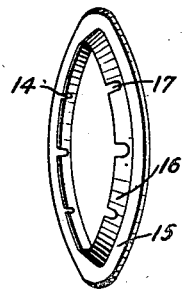
Fig.3.
INVENTOR
JACQUES MULLER
BY
ATTORNEY.

June 28, 1949.  J. MULLER  2,474,319
COUPLING FOR PIPING
Filed Nov. 27, 1942  2 Sheets-Sheet 2

INVENTOR
JACQUES MULLER
BY
ATTORNEY.

UNITED STATES PATENT OFFICE 2,474,319

COUPLING FOR PIPING

Jacques Muller, La Garenne Colombes, France; vested in the Attorney General of the United States Application November 27, 1942, Serial No. 467,153
In France September 10, 1940

Section 1, Public Law 690, August 8, 1946
Patent expires September 10, 1960

4 Claims. (Cl. 285—196)

This invention relates to couplings for piping or tubing such as pipes, tubes and hoses and has more particular reference to the type of such couplings comprising a sleeve-like member compressible intermediate the outer surface of the piping and rigid tightening means encompassing said sleeve and adapted to clamp it into tight contact with the piping surface.

An object of the invention is to provide a piping coupling of the aforesaid type having such an improved structure as to secure after tightening a leak-proof contact between the compressible or plastic sleeve and the piping while preventing undue disengagement of said sleeve and while also preserving to the coupling a certain amount of suppleness, thereby avoiding breakages due to hammering stresses of the metal under the influence of vibrations or ramming blows.

Another object of the invention is to provide an improved piping coupling wherein the tight contact between the sleeve and the piping can be accurately adjusted by properly setting the assembly pressure of the tightening means and, once set, said pressure remains constant under all circumstances.

A further object of the invention is to provide an improved piping coupling wherein the sleeve comprises two parts adding their respective effects, one of said parts being formed with an annular bead or bulge capable of becoming compressively squeezed owing to its inherent resiliency into leak-proof contact with the adjoining surfaces of the piping and a union housing said sleeve.

A still further object of the invention is to provide an improved piping coupling whose compressive and plastic sleeve is held clamped between the piping and a union under the action of rigid tightening means including a nut, the latter being advantageously of cap shape and exerting pressure both on said union and also gradually on the sleeve through the medium of an interposed braking member so arranged as to become distorted for partaking of the sealing effect and precluding leakages.

A still further object of the invention is to provide a piping coupling wherein the braking member is advantageously in the form of a distortable metal ring including a cylindrical portion adapted to partly sheath the sleeve and a frustum-shaped portion adapted to cooperate with the trailing end of the sleeve and to bite and anchor itself into the material of which the piping is made so as to procure proper leak-proofness even when the piping undergoes vibrations, any tendency to disengagement being automatically checked by said braking ring.

A still further object of the invention is to provide a piping coupling wherein the sleeve may be made up of two parts, the leading part being adapted to become distorted into leak-proof contact with the piping and union fitting thereover while the trailing part is intended to fulfil the dual function of a sealing member and a vibration absorber or damper, the distortable portion of the braking member being engageable through the space between said parts.

A still further object of the invention is to provide a piping coupling wherein in one of the embodiments the sleeve has a lip at its trailing end adapted to cooperate with the frustum-shaped portion or flange of the braking ring to assist in securing adequate proofness against leakages and undue disengagements.

With these and such other objects in view as will incidentally appear hereafter, the invention comprises the novel arrangement and combination of parts that will now be described more in detail with reference to the accompanying drawings exemplifying embodiments of the same and forming a part of the present disclosure.

In the drawings—

Figure 1 is an axial sectional view illustrating a coupling made in accordance with the invention and fitted to a pair of pipe sections abutted end to end, assuming the parts to occupy their non-tightened positions on the left hand side of this illustration and their tightened positions on the right hand side.

Figure 2 is a view similar to Fig. 1 illustrating constructional variations, the sleeve being shown in two parts on the left hand side of this illustration and in one part on its right hand side, respectively in untightened condition.

Fig. 2A is a view of the device of Fig. 2 shown in tightened condition.

Figure 3 is a perspective view of a ring comprising a plain cylindrical portion and a notched frustum-shaped portion, said ring being insertable as a braking element into a cap nut so as to cooperate with the compressible sleeve.

Like reference numerals designate like parts throughout the several views.

Figure 4:
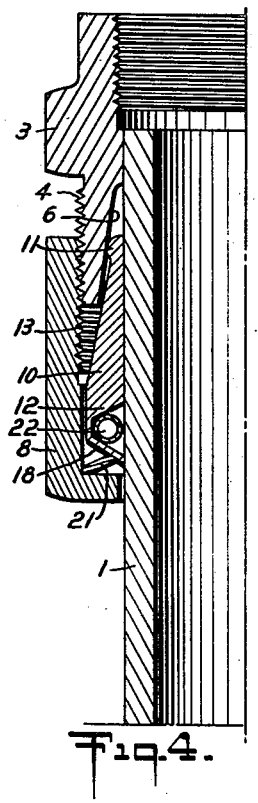
Figures 4, 5 and 6 are sectional views of constructional modifications of the coupling shown in Fig. 1, each of these modifications comprising metallic gaskets.
Figure 4A:
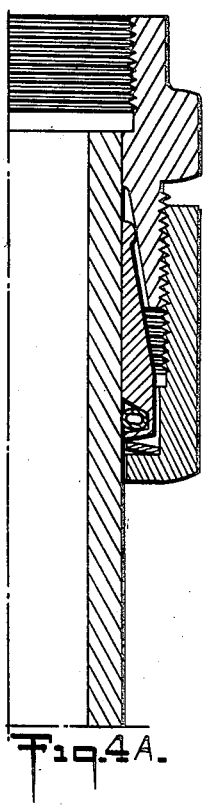
Fig. 4A is a view of the device of Fig. 4 shown in tightened condition.

Reference being first had to Figs. 1 and 2, the numerals 1, 2 designate a pair of pipe sections mutually aligned and abutted end to end. 3 is a union or nipple having in half longitudinal section an anvil-like outline as shown and provided with two threaded portions 4, 5 on its outer face and with oppositely directed outwardly divergent tapers 6, 7 on its inner face. 8, 9 are a pair of cap nuts whose tapped skirts can be screwed to a varying extent over the threaded portions 4, 5.

10, 10 designate a pair of compressible or plastic sleeves adapted to be clamped into tight contact intermediate the piping 1—2 and the union 3. Each sleeve 10 is provided at one end (which may be called the leading end) with an annular bead or bulge 11 and comprises an annular head or body 12 at the opposite end (which may be termed the trailing end). The head and bead are interconnected by a tapering portion 13. The degree of taper or conicity of this portion 13 with respect to the horizontal is smaller than that of the inner surfaces 6, 7 of the union 3.

14 designates a clamping or braking ring shown separately in Fig. 3 and comprising a plain cylindrical portion 15 and a frustum-shaped portion 16 formed with spaced nicks or notches 17 which enable it to become distorted when clamped into position.

In the constructional form illustrated in Fig. 1, the sleeve 10 is formed at its trailing end beyond its annular head 12 with a concentric lip 18 which slants off in a direction opposite to that in which the frustum-shaped portion 16 of the braking ring 14 slants. In the illustration shown by the left hand side of Fig. 2, the sleeve 10 is made up of two separate parts having an intermedate gap in which is received a portion of the breaking ring 14. Each part of the sleeve 10 partakes of the tightness and, moreover, the head part 12 also acts to absorb or damp vibrations.

The way of assembling a coupling as shown in Figs. 1 and 2 is as follows: Once the pipe sections 1, 2 are abutted end to end and engaged through the union 3 which does not require any special trimming, the leading or beaded ends 11 of the sleeves 10 are inserted at 6, 7 and the cylindrical parts 15 of the braking rings 14 are engaged over the sleeve heads 12. The nuts 8, 9 are afterwards screwed upon the threaded ends 4, 5 of the union 3. Owing to the ensuing compression, the beads 11 penetrate into the conical recesses 6, 7 and provide a first tight joint while the heads 12 which are also compressed provide a second tight joint. On completion of the clamping process, the frustum-shaped portions 16 of the braking ring 14 bite into the material of which the pipe sections are made and so become anchored to them. Such anchorage is completed in the form shown in Fig. 1 by that of the lip 18 which is compressed and brought closer to the head 12 by the nut push while in the form shown in Fig. 2 the separate head 12 forms an additional zone providing tightness and compression between the braking ring 14 and the piping. This permits the frustum-shaped portion of the braking ring 14 to be arranged in either direction or alternatively the braking ring to be duplicated, in opposite directions without any risk of disengagement. When the sleeve is made in two parts, there may be provided a threaded sheath 19 adapted to be screwed into the bore of the nut 8 and to cooperate with a washer 20 so as to clamp together the sleeve 10 and the braking ring 14.

In the modification illustrated in Fig. 4, there is provided between the lip 18 and the sleeve head 12 a hollow annulus 22 of circular cross section capable of resiliently flattening itself to an oval contour under the push exerted by a braking ring constituted by a conical washer and thus of providing an additional tight contact.

Figure 5:
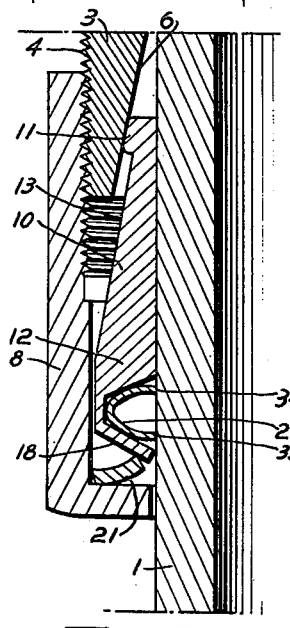

In the other modification shown in Fig. 5, the annulus 22 is replaced by a similarly behaving annular member 23 having a trough shape in cross section whose free edges 34, 35 are adjacent the piping 1 and can thus bite into it and so become anchored therein for checking any undue motion in either direction.

Figure 6:
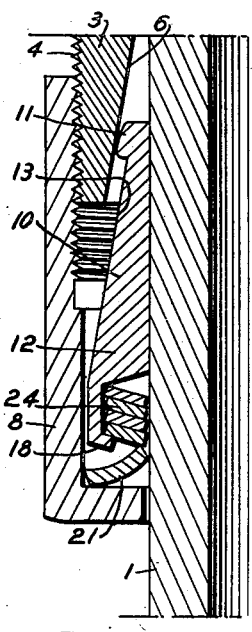

In the other modification shown in Fig. 6, the same action is performed by a set of resilient gasket washers 24 disposed in substantial parallelism and which by anchoring themselves into the wall of the piping 1 check any tendency of this piping to move in a direction opposite to the one in which motion is prevented by the action of a cooperating washer 21 abutted against the outermost face of the lip 18.

It will be understood that in the constructional forms shown in Figs. 4, 5 and 6 which are particularly concerned with rigid piping or tubing, the spheroidal shape of the bead 11 formed on the leading end of the sleeve 10 ensures proper leakproof tightness even when the piping 1 has a slight obliquity with respect to the union 3.

Figure 7:
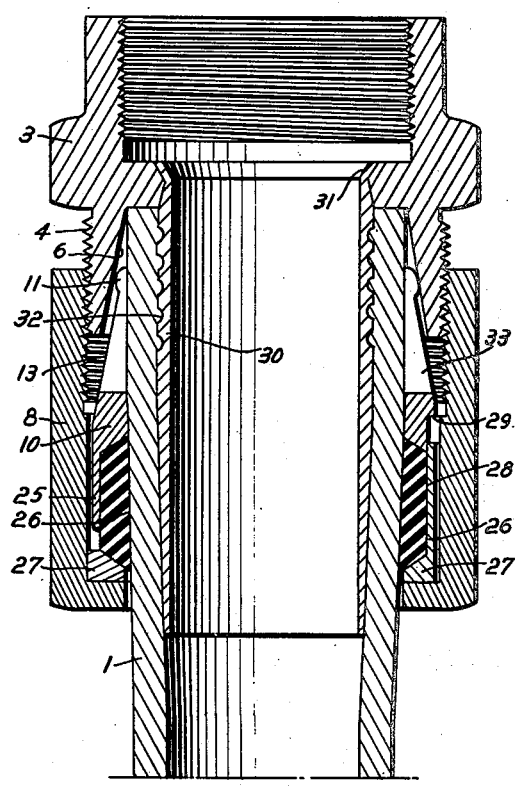
Figure 7 is an axial sectional view of a coupling adaptable to hoses.

The constructional form shown in Fig. 7 is applicable to a hose or soft tubing which is internally lagged with an elongated bushing 30 having one of its ends splayed at 31 over an inner shoulder 34 on the union 3. The bushing 30 may have a screw thread 32 of relatively large pitch on its outer face to engage a correspondingly tapped portion on the inner face of the hose 1. In this form, the compressible sleeve has axially extending slits 33 cut through its beaded leading end and over a portion of its tapering wall but its trailing end has no lip. The purpose of these slits is chiefly to enable the bead to be more strongly clamped to the union. The body portion of the sleeve 10 is formed with an inner annular recess 25 of angular outline to receive a plastic gasket 26 held by a clamping ring 27. This gasket precludes any fluid leakage from the rear part of the inside of the coupling since in this construction the sleeve is mainly adapted to exert a clamping effort rather than to provide tightness.

In the left hand side of Fig. 7, the clamping ring 27 is a mere annulus housed in the cap nut 8 and abutted against the adjacent edge of the plastic gasket 26. On the contrary, in the right hand side of Fig. 7, the clamping ring 27 is provided with an extension 28 encompassing the peripheral surface of the gasket 26 and abutted against a shoulder 29 formed on the periphery of the sleeve 10. This ensures a still better clamping effect.

The arrangement shown in Fig. 7 is applicable to rigid pipings subjected to vibrations in which case the bead 11 ensures both tightness and a holding effect while the gasket 26 absorbs or damps the vibrations.

It will be understood that owing to the aforesaid constructions, the objects of the invention are properly fulfilled since when set into position each compressible and plastic sleeve 10 is invariably held in tight and leakproof contact with the adjacent inner and outer parts while keeping its inherent resiliency, thereby preventing undue disengagement and breakages under stresses such as vibrations, fluid hammering or the like which might otherwise cause the metal parts to become brittle in the long run. In each constructional form, the bead on the leading end of the plastic sleeve is squeezed or resiliently compressed into perfectly tight contact and the leak-proofness is supplemented by the cooperation of the trailing end of the sleeve and piping. Moreover, provision of the braking member (which may be single or multiple) renders the coupling still more secure where somehow the nut might give way since besides sheathing the trailing end of the sleeve, said braking member is automatically anchored to the piping by flattening itself towards a plane at right angles to the longitudinal axis of the union. When provided, the braking member or ring maintains adequate pressure of the sleeve on the piping and union regardless of vibrations, while not curtailing the inherent pliability of the coupling. It will be understood that any undue disengagement is inhibited since any stress liable to cause it would bring about a deeper anchorage of the braking ring edge into the piping. This is due to the location of said edge to the rear of the sleeve so that if dragged by the piping, the braking ring would be brought closer to true perpendicularity and would thus still more bite into the piping.

The lip provided on the trailing end of the sleeve particularly where the latter is made of a metallo-plastic substance also assists in the attainment of perfect anchorage and tightness by cooperating with the braking ring.

Where the sleeve is built up of two parts, its body or head portion acts as a vibration damper and the other aims are also reached.

The sleeve might be grooved or fluted to prevent it from creeping or skidding with respect to adjoining parts but in all events breakage due to repeated hammering stress on the metal is precluded by the fact that such grooves or flutes would be located in a damped part.

All such and similar variations are included in the broad wording used in the subjoined claims wherein the word "piping" is also meant to include all kinds of pipes, tubes, hoses and like tubular lines or containers while the word "sleeve" involves a sleeve made bodily or in built up fashion of any suitable material capable of behaving as described for the purpose set forth.

What is claimed is:

1. In a coupling for cylindrical members, the combination of a sleeve of compressible material formed with a cylindrical interior conformably telescoped on the exterior of one of the cylindrical members, said compressible sleeve having an external taper flaring toward its axially outward end and in a direction away from the joint between the cylindrical members, an annular bead formed on the exterior of the sleeve adjacent its axially inward or leading end, an externally threaded union surrounding the sleeve and the cylindrical members and formed with a cylindrical internal portion telescoped on the cylindrical members and bridging the joint therebetween, said union having another tapered internal portion surrounding and overlying said compressible sleeve and flaring in the same direction as the external taper on said sleeve but at a smaller acute angle, clamping nut means including a cap nut threaded on the union, and distortible locking means surrounding a cylindrical member so as to transmit pressure between the outer end of the nut means and the outer or trailing end of said compressible sleeve whereby the sleeve is compressed between the internally tapered portion of the union and the exterior of the cylindrical member and whereby the parts are rendered immovable relative to each other, the trailing end of the compressible sleeve being formed adjacent its radially outward extremity with a radially inwardly projecting annular lip extending to engagement with the exterior of the cylindrical member at an axially outward slant toward the outer end of the nut, the said means transmitting pressure directly to said annular lip.

2. In a coupling for cylindrical members, the combination of a sleeve of compressible material formed with a cylindrical interior conformably telescoped on the exterior of one of the cylindrical members, said compressible sleeve having an external taper flaring toward its axially outward end and in a direction away from the joint between the cylindrical members, an annular bead formed on the exterior of the sleeve adjacent its axially inward or leading end, an externally threaded union surrounding the sleeve and the cylindrical members and formed with a cylindrical internal portion telescoped on the cylindrical members and bridging the joint therebetween, said union having another tapered internal portion surrounding and overlying said compressible sleeve and flaring in the same direction as the external taper on said sleeve but at a smaller acute angle, clamping nut means including a cap nut threaded on the union, and distortible locking means surrounding a cylindrical member so as to transmit pressure between the outer end of the nut means and the outer or trailing end of said compressible sleeve whereby the sleeve is compressed between the internally tapered portion of the union and the exterior of the cylindrical member and whereby the parts are rendered immovable relative to each other, the trailing end of the compressible sleeve being formed adjacent its radially outward extremity with a radially inwardly projecting annular lip extending to engagement with the exterior of the cylindrical member at an axially outward slant toward the outer end of the nut, the said means transmitting pressure directly to said annular lip, and a compressible annular gasket surrounding the cylindrical member and compressed in the space between the trailing end of the sleeve and the radially inward surface of said annular lip, and a resilient brake ring compressed between the outer end of the cap nut and said annular lip, said brake ring having axially inwardly slanting teeth biting into the exterior of the cylindrical member at the radially inward edge of the lip.

3. In a coupling for cylindrical members, the combination of a sleeve of compressible material formed with a cylindrical interior conformably telescoped on the exterior of one of the cylindrical members, said compressible sleeve having an external taper flaring toward its axially outward end and in a direction away from the joint between the cylindrical members, an annular bead formed on the exterior of the sleeve adjacent its axially inward or leading end, an externally threaded union surrounding the sleeve and the cylindrical members and formed with a cylindrical internal portion telescoped on the cylindrical members and bridging the joint therebetween, said union having another tapered internal portion surrounding and overlying said compressible sleeve and flaring in the same direction as the external taper or said sleeve but at a smaller acute angle, clamping nut means including a cap nut threaded on the union, and distortible locking means surrounding a cylindrical member so as to transmit pressure between the outer end of the nut means and the outer or trailing end of said compressible sleeve whereby the sleeve is compressed between the internally tapered portion of the union and the exterior of the cylindrical member and whereby the parts are rendered immovable relative to each other, the trailing end of the compressible sleeve being formed adjacent its radially outward extremity with a radially inwardly projecting annular lip extending to engagement with the exterior of the cylindrical member at an axially outward slant toward the outer end of the nut, the said means transmitting pressure directly to said annular lip, and a compressible annular gasket surrounding the cylindrical member and compressed in the space between the trailing end of the sleeve and the radially inward surface of said annular lip, and a resilient brake ring compressed between the outer end of the cap nut and said annular lip, said brake ring having axially inwardly slanting teeth biting into the radially outward surface of said lip.

4. In a coupling for cylindrical members, the combination of a sleeve of compressible material formed with a cylindrical interior conformably telescoped on the exterior of one of the cylindrical members, said compressible sleeve having an external taper flaring toward its axially outward end and in a direction away from the joint between the cylindrical members, an annular bead formed on the exterior of the sleeve adjacent its axially inward or leading end, an externally threaded union surrounding the sleeve and the cylindrical members and formed with a cylindrical internal portion telescoped on the cylindrical members and bridging the joint therebetween, said union having another tapered internal portion surrounding and overlying said compressible sleeve and flaring in the same direction as the external taper or said sleeve but at a smaller acute angle, clamping nut means including a cap nut threaded on the union, and distortible locking means surrounding a cylindrical member so as to transmit pressure between the outer end of the nut means and the outer or trailing end of said compressible sleeve whereby the sleeve is compressed between the internally tapered portion of the union and the exterior of the cylindrical member and whereby the parts are rendered immovable relative to each other, the trailing end of the compressible sleeve being formed adjacent its radially outward extremity with a radially inwardly projecting annular lip extending to engagement with the exterior of the cylindrical member at an axially outward slant toward the outer end of the nut, the said means transmitting pressure directly to said annular lip, and a compressible annular gasket surrounding the cylindrical member and compressed in the space between the trailing end of the sleeve and the radially inward surface of said annular lip, and a resilient brake ring compressed between the outer end of the cap nut and said annular lip, said ring having axially inwardly slanting teeth biting into the adjacent side of the gasket.

JACQUES MULLER.

REFERENCES CITED

The following references are of record in the file of this patent:

UNITED STATES PATENTS

| Number | Name | Date |
| --- | --- | --- |
| 1,186,813 | McFerran | June 13, 1916 |
| 1,822,056 | Noble | Sept. 8, 1931 |
| 2,239,252 | Sander | Apr. 22, 1941 |
| 2,288,506 | White | June 30, 1942 |